United States Patent
Stachowiak, Jr.

(10) Patent No.: US 10,443,769 B2
(45) Date of Patent: Oct. 15, 2019

(54) PIVOT JOINT

(71) Applicant: Weatherford Technology Holdings, LLC, Houston, TX (US)

(72) Inventor: John Edward Stachowiak, Jr., Houston, TX (US)

(73) Assignee: WEATHERFORD TECHNOLOGY HOLDINGS, LLC, Houston, TX (US)

(*) Notice: Subject to any disclaimer, the term of this patent is extended or adjusted under 35 U.S.C. 154(b) by 100 days.

(21) Appl. No.: 14/828,926

(22) Filed: Aug. 18, 2015

(65) Prior Publication Data
US 2016/0047191 A1 Feb. 18, 2016

Related U.S. Application Data

(60) Provisional application No. 62/038,742, filed on Aug. 18, 2014.

(51) Int. Cl.
| | |
|---|---|
| F16L 27/08 | (2006.01) |
| F16L 21/035 | (2006.01) |
| E21B 33/08 | (2006.01) |

(52) U.S. Cl.
CPC .............. *F16L 27/08* (2013.01); *E21B 33/08* (2013.01); *F16L 21/035* (2013.01)

(58) Field of Classification Search
CPC .... E21B 33/08; E21B 34/02; E21B 2034/005; E21B 43/121; F16J 15/187
See application file for complete search history.

(56) References Cited

U.S. PATENT DOCUMENTS

| | | | | |
|---|---|---|---|---|
| 1,947,198 A | * | 2/1934 | Goble | ..................... E21B 33/08 184/105.3 |
| 2,318,428 A | * | 5/1943 | Skinner | ................... E21B 33/08 285/148.3 |
| 4,360,186 A | * | 11/1982 | Tinsley | ................... E21B 33/06 251/1.2 |
| 4,889,184 A | | 12/1989 | Lugtmeier et al. | |
| 5,112,140 A | * | 5/1992 | Cherny | ................... E21B 33/08 384/16 |
| 6,000,469 A | | 12/1999 | Bassinger | |
| 6,412,783 B1 | | 7/2002 | Finnestad | |
| 6,585,416 B1 | * | 7/2003 | Rimmer | ................ F04B 53/144 277/503 |
| 7,284,602 B2 | * | 10/2007 | Tessier | .................... E21B 33/08 166/80.1 |
| 2003/0127220 A1 | * | 7/2003 | Farquharson | ........... E21B 33/08 166/86.3 |
| 2010/0109251 A1 | * | 5/2010 | Orlowski | ............... F16J 15/187 277/412 |
| 2012/0312548 A1 | * | 12/2012 | Swist | ..................... E21B 21/10 166/373 |

OTHER PUBLICATIONS

PCT International Search Report and Written Opinion dated Oct. 28, 2015, for International Application No. PCT/US2015/045631.
EPO Office Action dated Dec. 11, 2017, for European Patent Application No. 15756304.0.
Canadian Office Action dated Dec. 22, 2017, for Canadian Patent Application No. 2,958,234.
European Office Action in related application EP 15756304.0 dated Aug. 1, 2018.

* cited by examiner

*Primary Examiner* — James G Sayre
(74) *Attorney, Agent, or Firm* — Patterson + Sheridan, LLP

(57) ABSTRACT

A pivoting member is coupled to the stuffing box to allow the stuffing box to move in a radial direction relative to a wellhead.

21 Claims, 4 Drawing Sheets

PIVOT JOINT

BACKGROUND OF THE DISCLOSURE

Field of the Disclosure

Embodiments of the present disclosure generally relate to a pivot joint for joining two tools.

Description of the Related Art

The pumping action of a beam pump, commonly known as a "pumpjack", moves a polished rod in a reciprocating motion. The polished rod extends through an axial bore of a stuffing box. The stuffing box contains packing which forms a seal against the polished rod. During the pumping action, the polished rod may move in a lateral direction due to factors such as pump stroke, speed, surface unit alignment, type of surface unit utilized, and wind effects. When the polished rod is not axially aligned with the axial bore of the stuffing box, lateral pressure is exerted upon the stuffing box by the polished rod. This lateral pressure leads to wear and premature failure of both the packing and the polished rod, thereby causing well fluid to leak past the stuffing box packing and out onto the surrounding area of the wellhead.

There is a need, therefore, for a pivot joint coupled to the stuffing box for accommodating lateral movement of the polished rod.

SUMMARY OF THE DISCLOSURE

In one embodiment, a pivoting member is coupled to the stuffing box to allow the stuffing box to move in a radial direction, thereby relieving the stresses on the stuffing box packing.

In another embodiment, a pivot joint includes a housing; an adapter at least partially disposed in the housing; a bore extending through the housing and the adapter; a compressive member disposed between the adapter and the housing, wherein the compressive member axially separates the adapter from the housing; and a sealing member disposed between the adapter and the housing.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
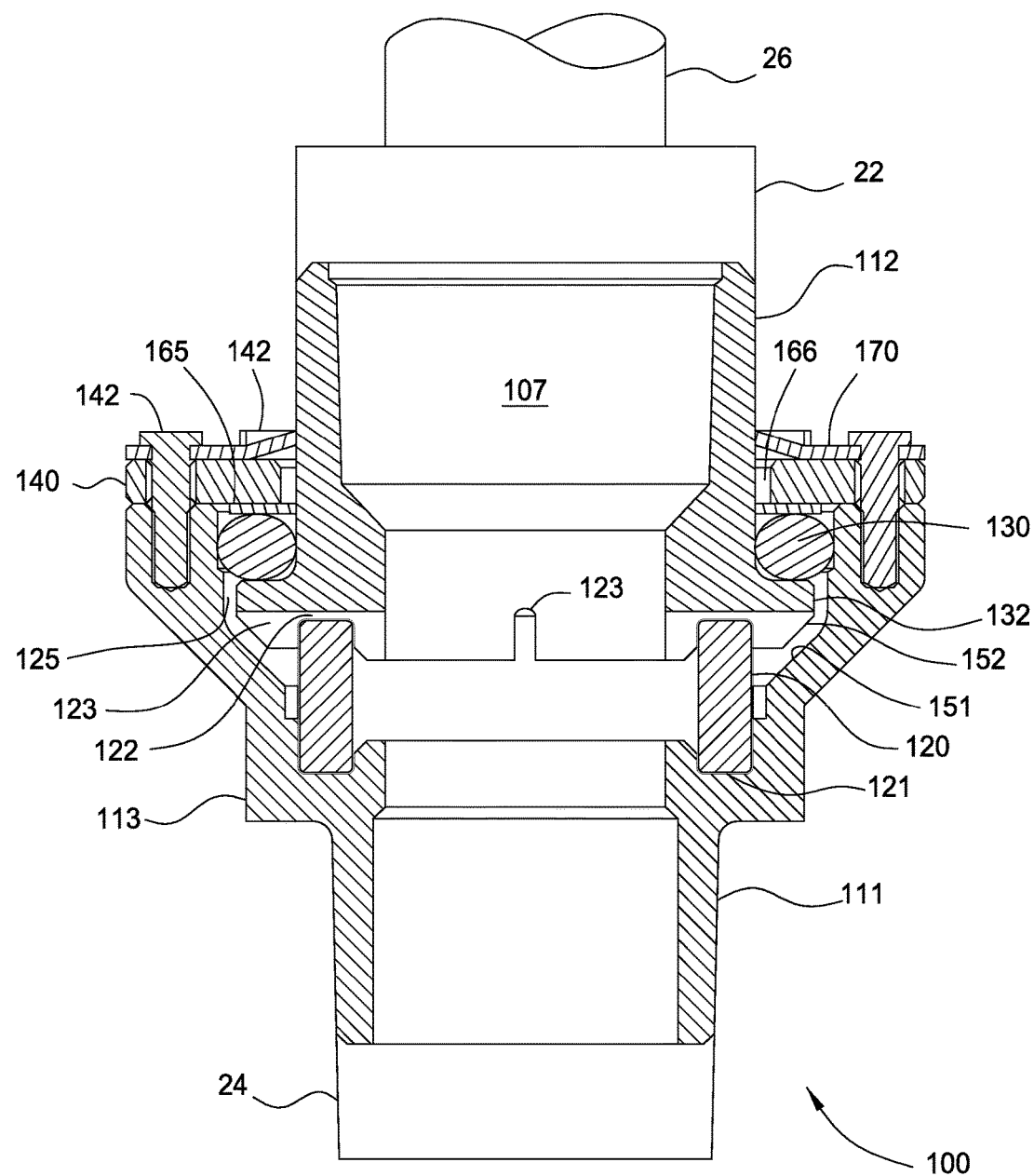
FIG. 1 is a cross-sectional view of an exemplary embodiment of a pivot joint.

FIG. 1 is a cross-sectional view of an exemplary embodiment of a pivot joint 100. The pivot joint 100 includes an adapter 112 coupled to a housing 111. A lower end of the housing 111 is configured to connect to a tool such as the wellhead. An upper end of the housing 111 is configured to at least partially receive the lower end of the adapter 112. The upper end of the adapter 112 is configured to connect to a tool such as the stuffing box. The pivot joint 100 includes a bore 107 for accommodating a tool such as the polished rod. As shown in FIG. 1, the upper end of the housing 111 has a larger inner diameter than the lower end for receiving the adapter 112 and to maintain substantially the same diameter sized bore 107 in the adapter 112 and the housing 111. Optionally, the exterior of the housing 111 may include "flat" sections 113 for engagement with a wrench or tong.

A compression member 120 is used to couple the adapter 112 to the housing 111. In one embodiment, the compression member 120 is a cylindrical ring. The compression member 120 is disposed between the adapter 112 and the housing 111 and axially separates the adapter 112 and the housing 111. The compression member 120 may be supported in the housing 111, and the adapter 112 is supported on the compression member 120. In one embodiment, recesses 121, 122 are formed in the adapter 112 and the housing 111 for receiving the compression member 120. During operation, the compression member 120 may deform and/or move radially relative to the housing 111. The compression member 120 may be made from an elastomer such as polyurethane, thermoplastic, fluoroelastomer, and nitrile rubber, metal, composites, and combinations thereof. One or more vent ports 123 may be formed in the adapter 112 to allow fluid communication between the bore 107 and the annular area 125 between the adapter 112 and the housing 111. In this respect, the vent ports 123 allow pressure equalization between the bore 107 and the annular area 125. The pivot joint 100 is shown with four vent ports 123, although any suitable number such as one, two, three, five or more vent ports may be provided.

The pivot joint 100 includes a sealing member 130 disposed between the adapter 112 and the housing 111 to prevent fluid from leaking out of the pivot joint 100. In one embodiment, the sealing member 130 may be disposed on a flange 132 extending from the outer diameter of the adapter 112. The sealing member 130 is energized radially, i.e., between an outer diameter of the adapter 112 and an inner diameter of the housing 111. As shown in FIG. 1, the sealing member 130 is an o-ring and is disposed around the outer surface of the adapter 112. The sealing member 130 is not limited to an "o-ring" type configuration as shown, but may have alternative cross sectional shapes that may be suitable for radial compression. In another example, the sealing member 130 includes multiple components such as, but not limited to, a lip-type member in conjunction with an o-ring type member. The sealing member 130 may be made of an elastomer such as polyurethane, thermoplastic, fluoroelastomer, and nitrile rubber, metal, composites, and combinations thereof. Because the sealing member 130 is energized radially, the adapter 112 may move axially relative to the sealing member 130 or housing 111 without breaking the fluid seal.

An annular plate 140 may be attached to the upper end of the housing 111 to retain the sealing member 130 in the housing 111. A plurality of fasteners 142 such as a bolt or screw may be used to attach the annular plate 140 to the housing 111.

An optional annular ring 165 may be disposed between the sealing member 130 and the annular plate 140. The annular ring 165 may have an inner diameter that is the same or substantially the same size as the outer diameter of the adapter 112. The outer diameter of the annular ring 165 is sized to allow the annular ring 165 to move with the adapter 112 without contacting the inner surface of the housing 111. The annular ring 165 prevents the sealing member 130 from extruding through the annular gap 166 defined by the inner diameter of the annular plate 140 and the adapter 112. The annular ring 165 may also serve as a barrier to prevent dust, or other particulate from entering the annular gap 166 from outside the pivot joint 100. The annular ring 165 may be made from a thermoplastic, metal, or other suitable material or combination of materials.

An optional shield member 170 may be utilized to prevent dust or particulate from entering the annular gap 166. The shield member 170 may be a shroud made from an elastomer such as rubber or other suitable flexible material. The shield member 170 may be retained using the fasteners 142. The shield member 170 may flex to accommodate lateral and/or axial movement of the adapter 112.

The pivot joint 100 allows the tool attached to the adapter 112 to move relative to the tool attached to the housing 111. As shown in FIG. 1, the adapter 112 may move axially and/or radially relative to the housing 111 due to the presence of the annular area 125. In response to a compressive force, the compression member 120 may be deformed to allow the adapter 112 to move downward. Also, the compression member 120 allows the adapter 112 to pivot relative to the housing 111. The sealing member 130 maintains the fluid tight seal when the adapter 112 moves axially, radially, or both.

At a predetermined compressive force, the adapter 112 is configured to contact the inner surface of the housing 111 to prevent an excessive axial force from being applied to the compressive member 120. In one embodiment, the inner surface 151 of the housing 111 is inclined. The outer surface of the adapter 112 may include an inclined surface 152 that complements the inclined surface 151 of the housing 111. The inclined surfaces 151, 152 make contact at a predetermined compressive force, thereby transferring the compressive force to the housing 111 instead of the compressive member 120. The geometrical configuration such as angle, length, and spacing of the inclined surfaces 152 and 151 is such that the adapter 112 and the housing 111 can move or pivot relative to each other with sufficient clearance while maintaining a sufficient load-bearing surface.

In operation, the pivot joint 100 is used to couple a stuffing box 22 to a wellhead 24, as shown in FIG. 1. A polished rod 26 extends through the stuffing box 22, pivot joint 100, and the wellhead 24. The polished rod 26 may be reciprocated using a beam pump or a rotoflex unit. When a lateral force is applied to the polished rod 26, the compressive member 120 allows the adapter 112 and the stuffing box 22 to pivot relative to the housing 111 and the wellhead 24. The sealing member 130 prevents fluid from leaking out of the pivot joint 100. Alternatively, or in addition to, when a compressive force is applied, the compressive member 120 allows the adapter 112 and the stuffing box 22 to move axially downward. Because the sealing member 130 is energized radially, axial movement of the adapter 112 does not break the fluid seal. In certain instances, a high amount of compressive force is applied to the compressive member 120. For example, during repair, the stuffing box 22 may be required to support entire weight of the polished rod 26. When the compressive force applied to the adapter 112 reaches a predetermined force, the adapter 112 may move downward sufficiently to contact the housing 111. In this respect, any force greater than the predetermined force is transferred to the housing 111 instead of being applied to the compressive member 120, thereby limiting wear or damage to the compressive member 120.

Figure 2:
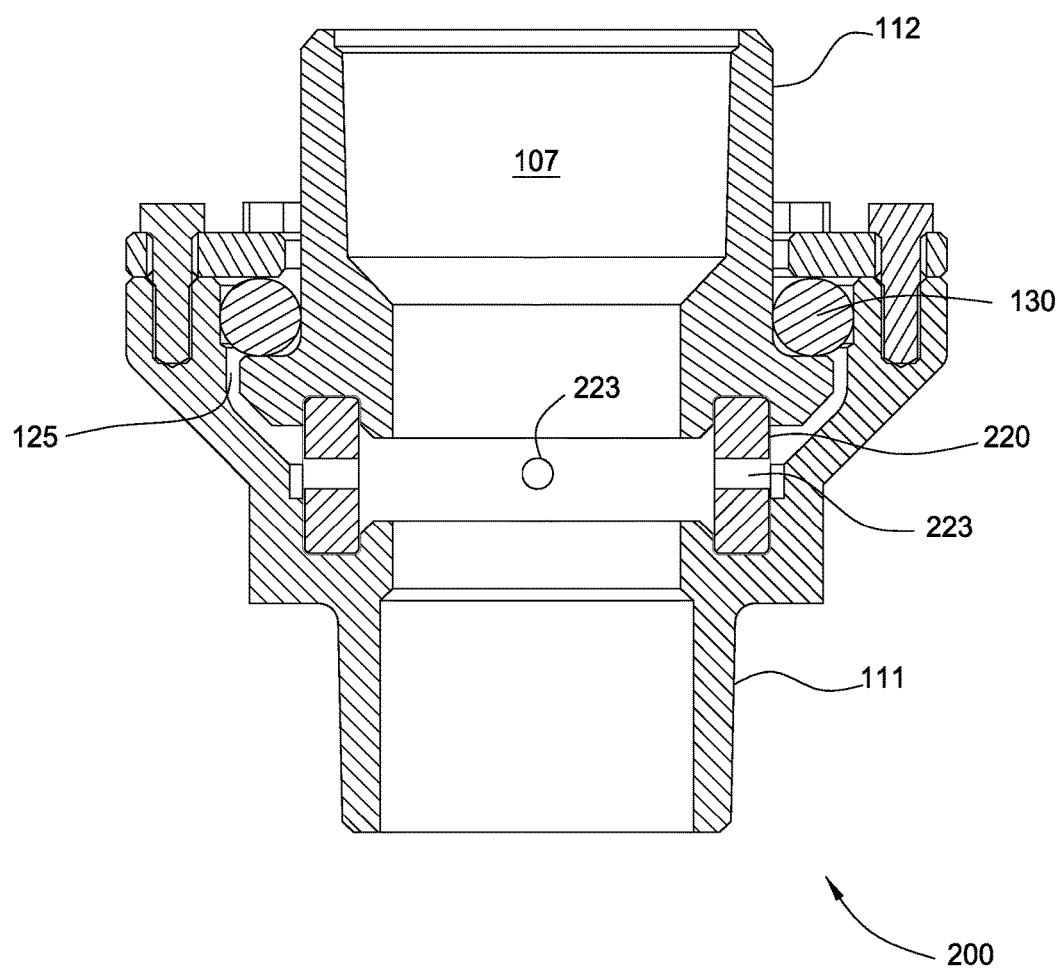
FIG. 2 illustrates another embodiment of a pivot joint.

FIG. 2 illustrates another exemplary embodiment of a pivot joint 200. For sake of clarity, like components of FIGS. 1 and 2 will not be described in detail. One of the differences between this embodiment and the embodiment shown in FIG. 1 is the vent ports 223. In FIG. 2, the vent ports 223 are formed through the compressive member 220. The vent ports 223 allow fluid communication between the bore 107 of and the annular area 125 between the adapter 112 and the housing 111. In another embodiment, the pivot joint may include vent ports 123 formed in the adapter 112 and vent ports 223 formed in the compressive member 220.

Figure 3:
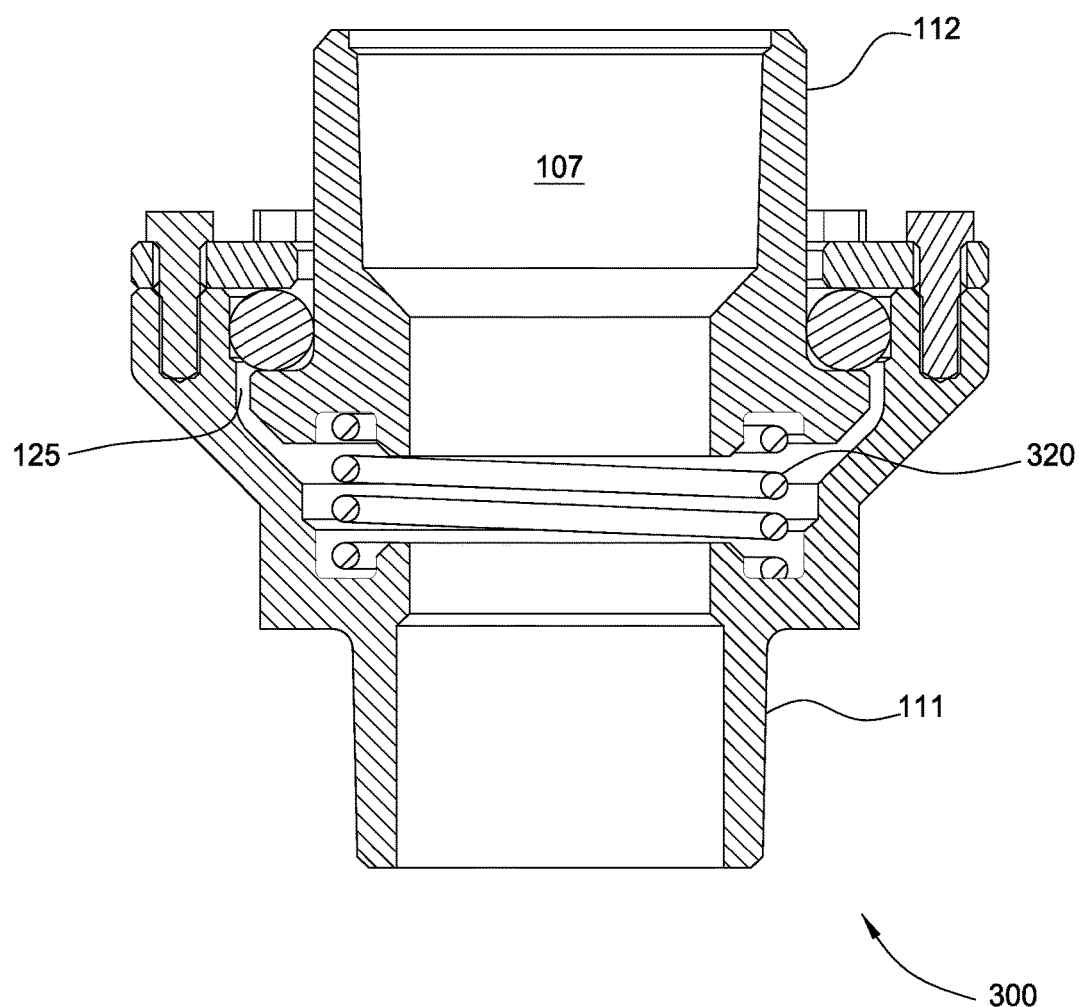
FIG. 3 illustrates another embodiment of a pivot joint.

FIG. 3 illustrates another exemplary embodiment of a pivot joint 300. For sake of clarity, like components of FIGS. 1 and 3 will not be described in detail. One of the differences between this embodiment and the embodiment shown in FIG. 1 is the compressive member 320. In FIG. 3, the compressive member 320 is a spring. The spring 320 allows axial and pivotal movement of the adapter 112 relative to the housing 111. Also, the spring 320 allows fluid communication between the bore 107 and the annular area 125 between the adapter 112 and the housing 111.

Figure 4:
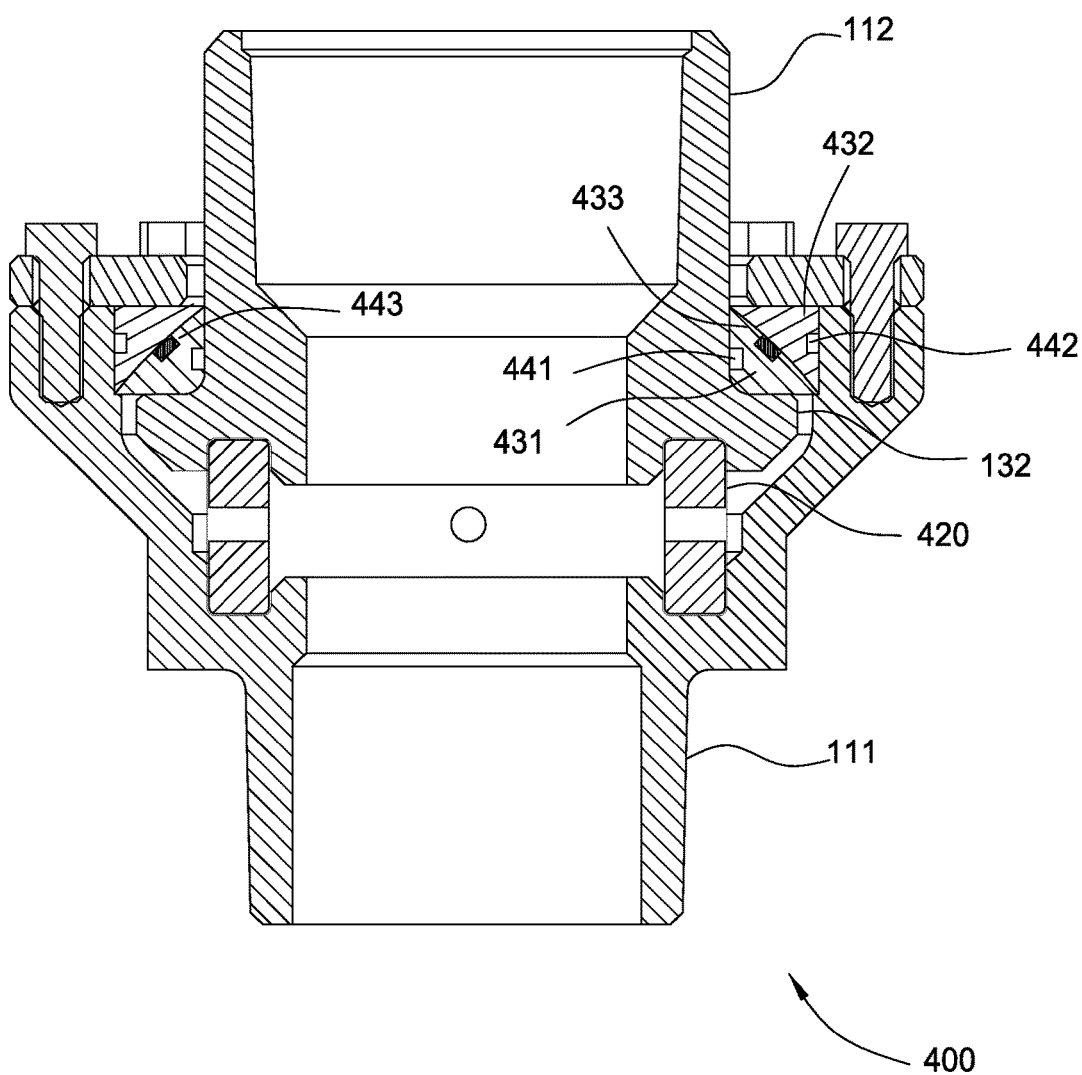
FIG. 4 illustrates another embodiment of a pivot joint.

FIG. 4 illustrates another exemplary embodiment of a pivot joint 400. For sake of clarity, like components of FIGS. 2 and 4 will not be described in detail. One of the differences between this embodiment and the embodiment shown in FIG. 2 is the sealing member. In FIG. 4, the sealing member includes two rigid members 431, 432 in sealing contact with each other. In one embodiment, the contact surface 433 is an arcuate surface. The arcuate contact surface 433 allows the adapter 112 to pivot relative to the housing 111 along the arcuate contact surface 433. As shown, the outer rigid member 432 is coupled to the housing 111 and the inner rigid member 431 is coupled to the adapter 112. The inner rigid member 431 is supported on the flange 132 and movable therewith. In one embodiment, an outer seal 442 is disposed between the outer rigid member 432 and the housing 111, and an inner seal 441 is disposed between the inner rigid member 431 and the adapter 112. Optionally, a secondary seal 443 may be provided between the inner rigid member 431 and the outer rigid member 432. Although this embodiment is shown with a compressive member 420 from FIG. 2, the compressive members 120, 320 from FIGS. 1 and 3 may also be used. It is contemplated a feature disclosed in one embodiment may suitably be used as an alternative feature in other embodiments disclosed herein.

In one embodiment, a pivot joint includes a housing; an adapter at least partially disposed in the housing; a bore extending through the housing and the adapter; a compressive member disposed between the adapter and the housing, wherein the compressive member axially separates the adapter from the housing; and a sealing member disposed between the adapter and the housing.

In one or more of the embodiments described herein, the sealing member is energized radially.

In one or more of the embodiments described herein, the joint includes a vent port for fluid communication between the bore and an annular area between the adapter and the housing.

In one or more of the embodiments described herein, the vent port is formed in the adapter.

In one or more of the embodiments described herein, the vent port is formed in the compressive member.

In one or more of the embodiments described herein, the compressive member comprises a spring.

In one or more of the embodiments described herein, the compressive member comprises a cylindrical ring.

In one or more of the embodiments described herein, the adapter is configured to contact the housing at a predetermined compressive force.

In one or more of the embodiments described herein, a contact surface between the adapter and the housing is inclined.

In one or more of the embodiments described herein, the sealing member comprises two rigid members movable relative to each other along an arcuate surface.

In one or more of the embodiments described herein, the joint includes a seal disposed between the two rigid members.

In one or more of the embodiments described herein, the sealing member comprises an o-ring.

In one or more of the embodiments described herein, the joint includes an annular plate for retaining the sealing member in the housing.

In one or more of the embodiments described herein, the joint includes an annular ring disposed between the sealing member and the annular plate.

In one or more of the embodiments described herein, the joint includes a shield member for blocking particulates from entering an annular area between the annular plate and the adapter.

In another embodiment, a pivot joint for coupling a stuffing box to a wellhead includes a housing having a lower end connected to the wellhead; an adapter at least partially disposed in the housing, wherein an upper end of the adapter is connected to the stuffing box; a bore extending through the housing and the adapter; a compressive member disposed between the adapter and the housing, wherein the compressive member axially separates the adapter from the housing; and a sealing member disposed between the adapter and the housing.

While the foregoing is directed to embodiments of the present disclosure, other and further embodiments of the disclosure may be devised without departing from the basic scope thereof, and the scope of the invention is determined by the claims that follow.

The invention claimed is:

1. A pivot joint, comprising:
a housing;
an adapter at least partially disposed in the housing;
a bore extending through the housing and the adapter;
a compressive member having a rectangular cross section and disposed between the adapter and the housing, wherein the compressive member axially separates the adapter from the housing and is disposed in recesses formed in the adapter and the housing;
a sealing member disposed between the adapter and the housing; and
a vent port for fluid communication between the bore and an annular area between the adapter and the housing, wherein the vent port is formed through a wall of the adapter.

2. The joint of claim 1, wherein the compressive member is a first compressive member;
the sealing member is a second compressive member; and
the first compressive and the second compressive member contact each of the adapter and the housing, wherein the first compressive member has an outer diameter smaller than an outer diameter of the second compressive member.

3. The joint of claim 1, wherein the adapter is configured to contact the housing at a predetermined compressive force.

4. The joint of claim 1, wherein the sealing member comprises two rigid members movable relative to each other along an arcuate surface.

5. The joint of claim 4, further comprising a seal disposed between the two rigid members.

6. The joint of claim 1, wherein the sealing member comprises an o-ring.

7. The joint of claim 1, wherein the compressive member contacts the recesses formed in the adapter and the housing.

8. A pivot joint for coupling a stuffing box to a wellhead, comprising:
a housing having a lower end connected to the wellhead;
an adapter at least partially disposed in the housing, wherein an upper end of the adapter is connected to the stuffing box;
a bore extending through the housing and the adapter; and
a first compressive member and a second compressive member disposed between the adapter and the housing, wherein the first compressive member has an outer diameter smaller than an outer diameter of the second compressive member, and wherein the first compressive member contacts the adapter and the housing.

9. The joint of claim 8, wherein the second compressive member is energized radially.

10. The joint of claim 8, further comprising a vent port for fluid communication between the bore and an annular area between the adapter and the housing.

11. The joint of claim 10, wherein the vent port is formed in the adapter.

12. The joint of claim 8, wherein the first compressive member comprises a rectangular cross section, and wherein the first compressive member is disposed in recesses formed in the adapter and the housing.

13. The joint of claim 8, wherein the adapter is configured to contact the housing at a predetermined compressive force.

14. The joint of claim 8, further comprising an annular plate for retaining the second compressive member in the housing.

15. The joint of claim 8, wherein the second compressive member has a circular cross section.

16. The joint of claim 8, wherein the second compressive member contacts the adapter and the housing.

17. The joint of claim 8, wherein the first compressive member axially separates the adapter from the housing and is disposed in recesses formed in the adapter and the housing.

18. A pivot joint, comprising:
a housing;
an adapter at least partially disposed in the housing;
a bore extending through the housing and the adapter;
a compressive member having a rectangular cross section and disposed between the adapter and the housing, wherein the compressive member axially separates the adapter from the housing and is disposed in recesses formed in the adapter and the housing; and
a sealing member disposed between the adapter and the housing;
wherein the adapter is laterally movable with respect to the housing.

19. The joint of claim 18, further comprising a vent port for fluid communication between the bore and an annular area between the adapter and the housing.

20. The joint of claim 19, wherein the vent port is formed in the adapter.

21. The pivot joint of claim 18, wherein the sealing member comprises an o-ring.

* * * * *